Dec. 30, 1924.    1,521,269
H. L. BLOOD ET AL
SYSTEM OF CONTROL
Filed Feb. 19, 1923    2 Sheets-Sheet 1
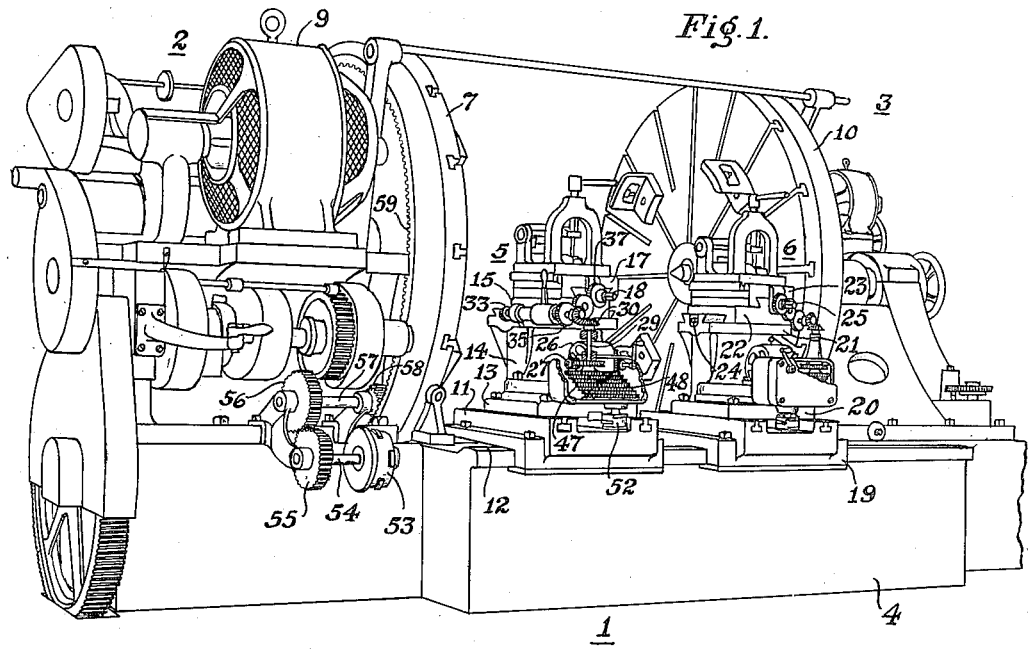
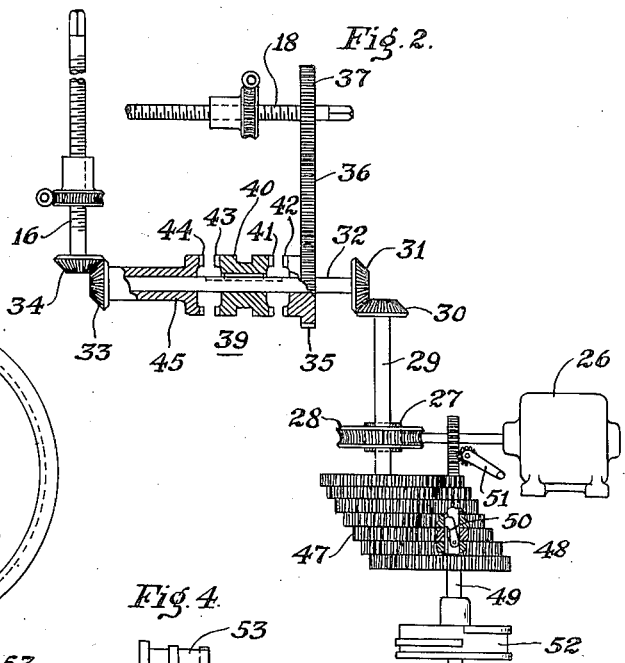
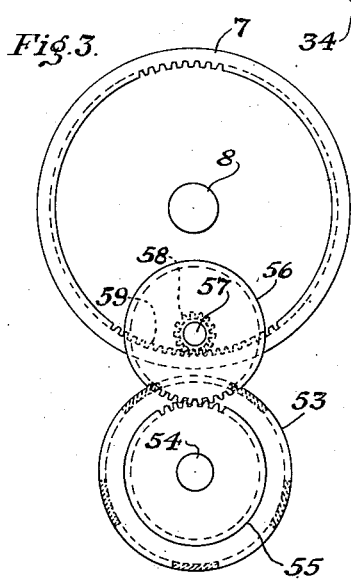
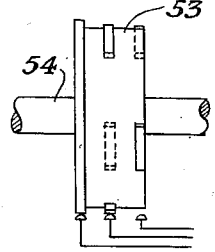
INVENTOR
H. L. Blood
and L. C. Cole
BY Wayne B Wells
ATTORNEY Dec. 30. 1924.
H. L. BLOOD ET AL
1,521,269
SYSTEM OF CONTROL
Filed Feb. 19, 1923    2 Sheets-Sheet 2
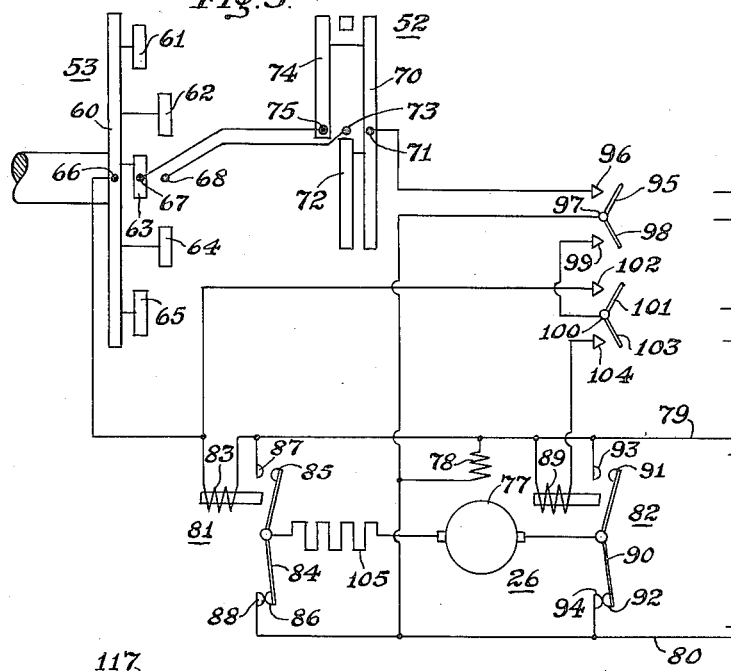
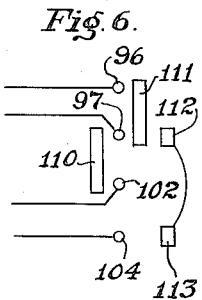
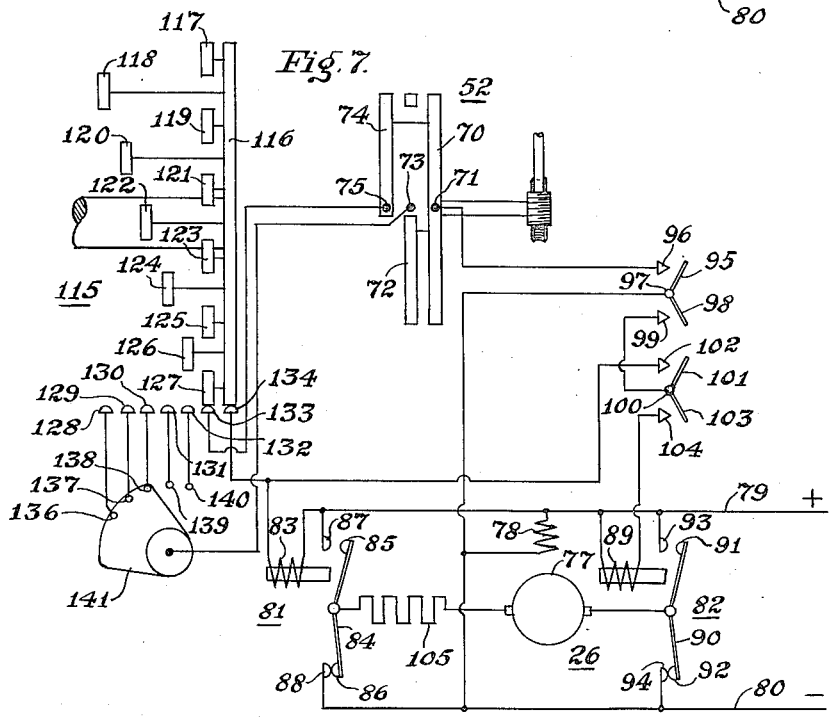
INVENTOR
H. L. Blood
and L. C. Cole
BY Wayne B. Wells
ATTORNEY Patented Dec. 30, 1924.

1,521,269

UNITED STATES PATENT OFFICE.

HAROLD L. BLOOD, OF NORTH PLAINFIELD, NEW JERSEY, AND LYNDON C. COLE, OF HAMILTON, OHIO, ASSIGNORS TO NILES-BEMENT-POND COMPANY, OF NEW YORK, N. Y., A CORPORATION OF NEW JERSEY.

SYSTEM OF CONTROL.

Application filed February 19, 1923. Serial No. 619,968.

*To all whom it may concern:*

Be it known that we, HAROLD L. BLOOD and LYNDON C. COLE, citizens of the United States, residing at North Plainfield, in the county of Somerset and State of New Jersey, and Hamilton, in the county of Butler and State of Ohio, respectively, have invented certain new and useful Improvements in Systems of Control, of which the following is a specification.

Our invention relates to control systems and particularly to control systems for governing the operation of machine tools.

One object of our invention is to provide a control system for a machine tool that shall effect intermittent feeding movements of a tool carriage either laterally or longitudinally with respect to the work spindle and at a constant rate per revolution of the work spindle.

Another object of our invention is to provide a control system for a machine tool that shall effect intermittent feeding movements of a tool carriage either laterally or longitudinally with respect to the work spindle at a constant rate per revolution of the spindle and that shall so operate the feed motor as to effect traversing movements of the carriage in either direction and longitudinally or transversely with respect to the work spindle.

Another object of our invention is to provide a control system of the above indicated character for a lathe that shall have a controller operated in accordance with the work spindle rotation and a limit switch operated by the feed motor for effecting intermittent feeding movements by the motor at a constant rate per revolution of the work spindle and that shall effect traversing operation of the motor independently of the controller and the limit switch.

A further object of our invention is to provide a control system of the above indicated character that shall have means for varying the rate of intermittent operation of the motor per revolution of the work spindle.

In operating many machine tools and particularly in operating large size lathes, such for example, as car-wheel lathes, it is desirable to effect automatically not only the feeding movements but also the traversing movements. In some large size lathes, the feed shaft which extends across the front of the machine is operated by the same power which operates the work spindle. Such feed shaft serves to effect automatic feeding movements of one or more cutting tools longitudinally with respect to the work spindle. The feeding movement of the tool laterally with respect to the work spindle is generally effected manually. Moreover, the traversing movements of the tools are effected manually in many large size lathes now in service.

In a control system constructed in accordance with our invention, a feed motor is provided for operating each cutting tool mounted on the machine. Each feed motor is generally controlled, during intermittent feeding, by means of a drum controller, which is operated in any suitable manner by the work spindle, and a limit switch, which is directly operated by the motor. Preferably, a clutch mechanism is provided for connecting the feed motor either to a feed shaft for effecting movement of the cutting tool longitudinally with respect to the work spindle or to a feed shaft for effecting lateral movement of the cutting tool with respect to the work spindle. The contact segments on the drum controller serve to close the circuit through the motor whereas the contact segments on the limit switch serve to limit the time of operation of the motor. Any suitable clutch mechanism may be provided for connecting the motor to the feed shaft for effecting movement of the cutting tool longitudinally with respect to the work spindle or for connecting the motor to a feed shaft for effecting movement of the cutting tool transversely with respect to the work spindle. In case it is desired to effect traversing movements of the cutting tool in either direction either transversely or longitudinally with respect to the work spindle, means are provided for operating the motor independently of the controller and the limit switch. Moreover, means are provided for completing a dynamic-braking circuit through the motor for effecting a quick stopping thereof.

In the accompanying drawings:

Figure 1 is a front elevational view of a car-wheel lathe controlled in accordance with our invention.

Fig. 2 is a diagrammatic view of the connections between the two feed shafts and the feed motor.

Fig. 3 is a view illustrating the connection of the drum controller to the work spindle.

Fig. 4 is a side elevational view of the drum controller.

Fig. 5 is a diagrammatic view of the control circuits for operating the feed motor.

Fig. 6 is a diagrammatic view showing a drum controller for replacing the push buttons shown in Fig. 5.

Fig. 7 is a diagrammatic view illustrating a modification of our invention.

Referring to the accompanying drawings, a car-wheel lathe 1 having two headstocks 2 and 3 is shown controlled in accordance with our invention. The headstocks 2 and 3 are mounted on a suitable base 4, the headstock 2 being fixedly connected to the base and the headstock 3 being slidably mounted thereon. Two tool rests 5 and 6 are located between the two headstocks 2 and 3.

The headstock 2, which is fixedly connected to the base 4, comprises a face plate 7 mounted on a work spindle 8. The work spindle 8 is rotated in any suitable manner by a main driving motor 9. Inasmuch as our invention is not particularly limited to the illustrated headstock construction, further description thereof is deemed unnecessary. The headstock 3, which is movable along the base 4 for adjustment relative to the work being operated on, comprises a face plate 10. The face plate 10 is mounted on a suitable spindle which is rotated in any suitable manner by the driving motor 9.

The tool rest 5 comprises a base member 11 which is movable along ways 12 formed on the base 4. A plate 13 is adjustable transversely with respect to the work spindle of the lathe on the base member 11. A body portion 14 of the tool rest is swiveled in any suitable manner on the plate 13. A longitudinal slide 15, which is fitted to ways on the body portion 14, is operated by a feed screw 16 to effect movement of the cutting tool longitudinally of the work spindle. A transverse slide 17 is fitted to ways formed on the longitudinal slide 15 and is operated by a feed screw 18. The feed screw 18 serves to effect movement of the cutting tool transversely with respect to the work spindle. The slide 17 directly carries the cutting tool.

The tool rest 6 is similar in construction to the tool rest 5 and comprises a base 19, a plate 20 mounted on the base, a body portion 21, a longitudinal slide 22, a transverse slide 23, and feed screws 24 and 25. The feed screws 24 and 25, respectively, serve to effect feeding movements of the slides 22 and 23. A further description of the tool rest 6 is deemed unnecessary inasmuch as the tool rest 6 is similar in construction and in operation to the tool rest 5.

The feed screws 16 and 18 are operated by a feed motor 26 either for effecting intermittent feeding movements or for effecting traversing movements. The term "intermittent feed" as used in this specification is intended to cover a step-by-step feed which may be continuous in a forward or in a reverse direction. The motor 26 is directly mounted on the body portion 14 of the tool rest, as shown in Fig. 1 of the drawings. The armature shaft of motor 26 carries a worm 27 which meshes with a worm wheel 28. The worm wheel 28 is mounted on a shaft 29. A bevel gear wheel 30, which is mounted on one end of the shaft 29, meshes with a bevel gear wheel 31 which is mounted on a shaft 32. A sleeve 45, which is mounted on the opposite end of the shaft 32, has a bevel gear wheel 33 formed on it. The gear wheel 33 meshes with a bevel gear wheel 34 which is directly mounted on the feed screw 16. The feed screw 16, as before set forth, serves to effect movement of the cutting tool longitudinally with respect to the work spindle. A gear wheel 35, which is rotatably mounted on the shaft 32 intermediate the bevel gear wheels 31 and 33, meshes with an idler gear wheel 36. The gear wheel 36 meshes with a gear wheel 37 on the feed screw 18. The feed screw 18, as before set forth, serves to effect movement of the cutting tool laterally with respect to the work spindle.

A clutch mechanism 39 is provided for selectively connecting the feed screws 16 and 18 to the feed motor 26. Such clutch mechanism comprises a clutch member 40 which is splined to the shaft 32. The clutch member 40 is provided with clutch teeth 41 which are adapted to engage clutch teeth 42 formed on the gear wheel 35. The clutch member 40 also is provided with clutch teeth 43 which are adapted to engage clutch teeth 44 which are formed on the sleeve 45 connected to the bevel gear wheel 33. Thus, when the clutch member 40 is moved in one direction, the clutch teeth 41 and 42 mesh to connect the feed screw 18 to the motor 26 and when the clutch member 40 is moved in an opposite direction, the clutch teeth 43 and 44 mesh to connect the feed screw 16 with the motor 26.

The shaft 29 carries a set of gears 47 which are adapted to mesh with a set of gears 48 mounted on a shaft 49. The set of gears 47 are keyed to the shaft 29 whereas the set of gears 48 are selectively connected to the shaft 49 in any suitable manner. In the drawings, a key member 50 is selectively operated by a lever 51 for connecting any one of the gear wheels in the set 48 to the corresponding gear wheel in the set 47. The shaft 49 also carries a limit switch 52 which will be described hereinafter when reference is made to Fig. 5 of the drawings.

A drum controller 53 is operated in any suitable manner in accordance with the rotation of the work spindle 8 on the face plate 7. The drum controller is shown mounted on a shaft 54 which carries a gear wheel 55. The gear wheel 55 meshes with a gear wheel 56 which is mounted on a shaft 57. The shaft 57 carries a pinion 58 which meshes with teeth 59 formed on the inside of a face plate 7. The gearing between the controller and the face plate may be adjusted to obtain any desired speed of rotation of the controller. However, it is preferable to have the controller rotate at the same speed as the face plate.

Referring to Fig. 5 of the drawings, the connections for operating the feed motor 26 are illustrated. The drum controller 53 is shown comprising contact segments 60 to 65, inclusive, which are adapted to engage contact fingers 66, 67, and 68. The contact segment 60 is in engagement with the contact finger 66 at all times. The contact segments 61, 63 and 65 are adapted to engage the contact finger 67 and the contact segments 62 and 64 are adapted to engage the contact finger 68. The contact segments 61 to 65, inclusive, are electrically connected to the contact segment 60. In the above construction, it will be noted, a circuit from the contact finger 66 is alternately connected to the contact fingers 67 and 68 during the rotation of the controller.

The limit switch 52 comprises a contact segment 70, which is adapted to engage a contact finger 71, a contact segment 72, which is adapted to engage a contact finger 73 and a contact segment 74 which is adapted to engage a contact finger 75. The contact fingers 73 and 75 of the limit switch are respectively connected to the contact fingers 68 and 67 of the drum controller 53.

The feed motor 26 comprises an armature 77 and a field magnet winding 78. The field magnet winding 78 is directly connected across a supply circuit comprising conductors 79 and 80. Two electro-magnet switches 81 and 82 are provided for selectively connecting the armature 77 across the supply conductors 79 and 80, and also for completing a dynamic-braking circuit through such armature. The switch 81 comprises an electro-magnet 83 which is adapted to operate a switch arm 84. The switch arm 84 carries contact members 85 and 86 which are respectively adapted to engage contact members 87 and 88. When the switch arm is in the released position, as shown in the drawings, the contact members 86 and 88 are in engagement with each other and when the switch arm is operated by the electro-magnet 83, the contact members 85 and 87 are in engagement with each other.

The switch 82 comprises an electro-magnet 89, which operates a switch arm 90. The switch arm 90 carries two contact members 91 and 92 which are respectively adapted to engage contact members 93 and 94. The contact members 92 and 94 are in engagement with each other in the released position of the switch and the contact members 91 and 93 are in engagement with each other in the operative position of the switch.

Any suitable switch 95, which is adapted to bridge contact members 96 and 97, is provided for effecting intermittent feeding operation of the motor 26. The contact member 96 is directly connected to the contact finger 71 of the limit switch 52 and the contact finger 97 is directly connected to the supply conductor 80. A traverse switch 98 is provided for bridging contact members 97 and 99. The contact member 99 is connected to a contact member 100. The switch 98 bridges the contact members 97 and 99 for effecting continuous operation of the motor 26. A switch 101 is provided for bridging contact members 100 and 102. The contact member 102 is connected through the electro-magnet 83 to the supply conductor 79. When the switch 101 bridges the contact members 100 and 102 and the switch 98 bridges the contact members 97 and 99, the electro-magnet switch 81 is operated for effecting continuous operation of the motor 26 in a forward direction.

A switch 103 is provided for bridging contact members 100 and 104. The contact member 104 is connected through the electro-magnet 89 to the supply conductor 79. The simultaneous operation of the switches 103 and 98 serves to energize the electro-magnet switch 89 and to effect continuous operation of the motor 26 in a reverse direction.

In case it is desired to effect intermittent feeding movements of the cutting tool either laterally or longitudinally with respect to the work spindle, the switch 95 is moved to bridge the contact members 96 and 97. It is to be understood that the feed screw 16 or the feed screw 18 may be operated by the motor 26 according to the position of the clutch mechanism. A circuit is completed through the electro-magnet 83 which extends from the supply conductor 80 through the contact members 97 and 96, which are bridged by the switch 95, contact fingers 71 and 75 of the limit switch, which are bridged by the contact segments 70 and 74, contact fingers 67 and 66 of the controller 53, which are bridged by the contact segments 63 and 60, and the electro-magnet 83 to the supply conductor 79. The switch 81 is operated and a circuit is completed through the armature 77, which extends from the supply conductor 79 through contact members 87 and 85, switch arm 84, braking resistor 105, armature 77, switch arm 90 and the contact members 92 and 94 to the other supply conductor 80.

The motor not only effects movement of one of the feed screws 16 and 18 but also effects operation of the limit switch 52 through the sets of gears 47 and 48. When the limit switch 52 has made one-half revolution, the contact finger 75 is separated from the contact segment 74 and consequently the circuit through the electromagnet 83 is broken. Upon release of the switch 81, a braking circuit is completed through the armature 77 which extends from one terminal of the armature through the braking resistor 105, switch arm 84, contact members 86 and 88, contact members 94 and 92 and switch arm 90 to the other terminal of the armature. The drum controller 53, which is operated in accordance with the rotation of the work spindle, is moved to effect engagement between the contact finger 68 and the contact segment 62. Thereupon, a circu t is completed through the contact segment 72 and the contact finger 73 of the limit switch for completing a circuit through the electro-magnet 83. Upon disengagement between the contact segment 74 and the contact finger 75 of the limit switch, the contact segment 72 is moved into engagement with contact finger 73. The circuit through the electro-magnet 83 is similar to the circuit previously traced therethrough. The switch 81 is again operated and a circuit is completed through the motor 26. The above cycle of operations is continued as long as the switch 95 bridges the contact members 96 and 97. In this regard attention is called to the fact that a cutting tool may be fed either longitudinally or laterally with respect to the work spindle by means of the switch 95.

In case a traverse operation of the cutting tool is desired, the switch 98 is moved to bridge contact members 97 and 99 and the switch member 101 or the switch 103 is operated according to the desired direct on of rotation of the motor. Assuming the contact members 100 and 102 to be bridged by the switch 101 and the contact members 97 and 99 to be bridged by the switch 98, a circuit is completed for effecting traversing or continuous operation of the motor 26 in a forward direction. The clutch mechanism 39 may be operated for effecting traversing movement either of the screw shaft 16 or of the screw shaft 18. A circuit is completed through the electro-magnet 83 which extends through the supply conductor 79 through the electro-magnet 83, contact members 102 and 100, which are bridged by the switch 101, and the contact members 99 and 97, which are bridged by the switch 98 to the supply conductor 80. The switch 81 is operated for effecting continuous operation of the motor 26. In this regard it will be noted the circuit through the electro-magnet 83 is completed independently of the controller 53 and the limit switch 52.

In case it is desired to effect traversing operation in a reverse direction in place of in a forward direction, the switch 103 is operated n place of the switch 101. When the switch 103 is operated, a circuit is completed through the electro-magnet 89, which extends from the supply conductor 79 through the electro-magnet 89, contact members 104 and 100, which are bridged by the switch 103, contact members 97 and 99, which are bridged by the switch 98, to the supply conductor 80. The switch 82 is operated and a circuit is completed through the motor 26 for operating it n a reverse direction. The circuit through the motor extends from the supply conductor 79 through the contact members 91 and 93, contact arm 90, armature 77, braking resistor 105, contact arm 84, and the contact members 86 and 88 to the supply conductor 80. Upon release of either of the switches 81 and 82, a dynamic-braking circuit is completed through the motor 26 as hereinbefore set forth.

Referring to Fig. 6 of the drawings, a drum controller is d agrammatically illustrated which may be used in place of the switches 95, 98, 101 and 103 if so desired. The controller comprises contact segments 110, 111, 112 and 113. The contact fingers in Fig. 6 of the drawings have been designated by similar reference characters to those used in Fig. 5 of the drawings in order to show the connection of the controller in F g. 6 to the system shown in Fig. 5. When the controller is moved to bridge contact fingers 97 and 102 by the contact segment 110, a circuit is completed through the electro-magnet 83 for effecting traversing operation of the motor in the forward direction. When the controller is moved to bridge the contact fingers 96 and 97 by the contact segment 111, intermittent feeding operation of the motor is effected. When the controller is moved to bridge the contact fingers 97 and 104 by the contact segments 112 and 113, the electro-magnet 89 is energized to effect traversing operation of the motor 26 in a reverse direction.

Referring to Fig. 7 of the drawings, a modification of our invention is illustrated wherein the motor is directly connected to the limit switch without the interposition of any change gears. In the system disclosed in Fig. 7 of the drawings similar parts to those shown in the system of Fig. 5 have been designated by like reference characters. A drum controller 115 is provided which is operated in a manner similar to the operation of the controller 53 illustrated in Fig. 5 of the drawings. The controller comprises contact segments 116 to 127, inclusive, which engage contact fingers 128 to 134 inclusive. The contact segments 118, 120, 122, 124 and 126 are respectively adapted to engage the contact fingers 128, 129, 130, 131 and 132. The contact segments 117, 119, 121, 123, 125 and 127 are adapted to engage the contact finger 133. The contact segment 116, which is electrically connected to all the other contact segments is connected to the contact finger 134. The contact finger 134 is connected to one terminal of the electro-magnet 83. The contact finger 133 is connected to the contact finger 75 of the limit switch 52. The contact fingers 128, 129, 130, 131 and 132 are respectively connected to contact members 136, 137, 138, 139 and 140 which are engaged by a contact arm 141.

When the switch 95 bridges the contact members 96 and 97 in the system disclosed in Fig. 5 of the drawings, the circuit through the electro-magnet 83 is closed by means of the controller 53 and is opened by means of the limit switch 52. The length of each feeding operation or movement of the motor may be varied by selectively operating the sets of gears 47 and 48, which are illustrated in Fig. 2 of the drawings.

In the system disclosed in Fig. 7 of the drawings, the sets of gears 47 and 48 are replaced by contact segments directly mounted on the controller 115. The contact arm 141, which is adapted to engage the contact members 136 to 140, inclusive, determines the number of contact segments 118, 120, 122, 124 and 126 which are included in circuit with the motor during intermittent feeding operation. If the contact arm 141 is only in engagement with the contact member 136 then only two feeding impulses of the motor are effected per revolution of the controller 115. When the contact arm is moved into engagement with the contact member 137, four feeding impulses per revolution of the controller are produced. The contact arm 141 is shown in engagement with the contact members 136, 137 and 138 to produce six feeding impulses per revolution of the controller. Thus by varying the position of the contact arm 141, the number of feeding impulses and accordingly the amount of feed per revolution of the spindle is varied.

The system disclosed in Fig. 7 differs from the system disclosed in Fig. 5 chiefly as to the character of feeding impulses for operating the motor. The length of the feeding impulses in the system of Fig. 7 are maintained constant whereas the number of such feeding impulses per revolution of the work spindle may be varied. In the system disclosed in Fig. 5, as heretofore set forth, the number of feeding impulses is maintained constant whereas the length of the impulses may be varied as desired by operating the sets of gears 47 and 48. In the system of Fig. 7, the limit switch 52 is rotated at a constant speed whereas in the system disclosed in Fig. 5, the speed of the limit switch is varied.

The circuits in Fig. 7 for effecting a traversing operation of the motor are similar to such circuits in Fig. 5 and accordingly a description thereof is deemed unnecessary. The circuit through the controller 115 for effecting intermittent operation of the motor will be traced. Assuming the switch 95 to be closed and the contact arm 141 to be in the position shown, a circuit is completed which extends from the supply conductor 80 through contact members 96 and 97, which are bridged by the switch 95, contact fingers 71 and 75, which are bridged by the contact segments 70 and 74, contact fingers 133 and 134, which are bridged by the contact segments 127 and 116, and the electro-magnet 83 to the supply conductor 79. The electro-magnet switch 81 is operated and the motor 26 is rotated in a forward direction to feed the tool rest. Such movement of the motor continues until the contact segment 74 disengages the contact finger 75 and the contact finger 73 engages the contact segment 72. The circuit of the motor is maintained open until the contact segment 122 of the drum controller 115 engages the contact finger 130. When the segment 122 engages the finger 130, a circuit is completed through the electro-magnet 83 which extends from the supply conductor 80 through the contact members 96 and 97, which are bridged by the switch 95, contact fingers 71 and 73, which are bridged by the contact segments 70 and 72, contact arm 141, contact member 138, contact fingers 130 and 134, which are bridged by the contact segments 122 and 116, and the electro-magnet 83 to the supply conductor 79. The motor 26 is again operated. Such feeding operation continues until the contact segment 72 is separated from the contact finger 73 and the contact finger 74 engages the contact finger 75. The succeeding impulses are completed through the contact segments 121, 120, 119 and 118 of the controller 115. A dynamic-braking circuit is completed through the motor 26 after each operation thereof in the same manner as described when reference was made to the system shown in Fig. 5 of the drawings.

Modifications in the system and in the arrangement and location of parts may be made within the spirit and scope of our invention, and such modifications are intended to be covered by the appended claims.

What we claim is:

1. In a control system for a machine tool, the combination with a rotating work spindle and a drum controller operated in accordance with the rotation of the spindle, of a feed motor, a limit switch operated by said motor, and means for completing a circuit of the motor through said drum controller and the limit switch to effect intermittent feeding movements of the motor at a constant rate per revolution of said spindle.

2. In a control system for a machine tool, the combination with a rotating work spindle and a drum controller operated in accordance with the rotation of said spindle, of a feed motor, a limit switch operated by said motor, and an auxiliary switch for completing a circuit of the motor through said drum controller and the limit switch to effect intermittent feeding movements of the motor at a constant rate per revolution of said spindle.

3. In a control system for a machine tool, the combination with a rotating work spindle and a drum controller operated in accordance with the rotation of said spindle, of a feed motor, a limit switch operated by said motor, and means for completing a circuit of said motor through said drum controller and the limit switch to effect intermittent feeding movements of the motor at a constant rate per revolution of the spindle and for completing a motor circuit independent of the controller and limit switch to effect traversing movement of the cutting tool in either direction.

4. In a control system for a machine tool, the combination with a rotating work spindle and a drum controller operated in accordance with the rotation of said spindle, of a feed motor, a limit switch operated in accordance with the speed of the motor, means for varying the speed ratio between the motor and the limit switch, and means for completing the motor circuit through said drum switch and the limit switch to effect feeding movements of the motor at any desired constant rate per revolution of the spindle.

5. In a control system for a machine tool, the combination with a rotating work spindle and a feed motor, of means controlled in accordance with the operation of the spindle and the motor for intermittently operating the motor.

6. In a control system for a machine tool, the combination with a rotating work spindle and a feed motor, of means comprising a controller operated in accordance with the operation of the spindle and a limit switch operated by the motor for effecting intermittent operation of the motor.

7. In a control system for a machine tool, the combination with a rotating work spindle and a feed motor, of means comprising a controller operated in accordance with the operation of the spindle and a limit switch operated by the motor for effecting intermittent operation of the motor, and means for varying the operation of the switch to vary the rate of operation of the motor.

8. In a control system for a machine tool, the combination with a rotating work spindle and a feed motor, of means comprising a controller operated in accordance with the operation of the spindle and a limit switch for effecting intermittent operation of the motor, and a set of gear wheels for connecting the switch to the motor and for varying the rate of operation of the motor.

9. In a control system for a machine tool, the combination with a rotating spindle, a controller operated in timed relation to the rotation of the spindle, a rotatable limit switch, and a motor connected in circuit with the controller and the switch, said controller and the switch serving to effect intermittent operation of the motor, of means for varying the operation of the limit switch to vary the intermittent operation of the motor.

10. In a control system for a machine tool, the combination with a rotating spindle, a drum controller operated in timed relation to the rotation of the spindle, a rotatable limit switch, and a motor connected in circuit with said controller and the switch, said motor being adapted to rotate the limit switch and said controller and the switch serving to effect intermittent operation of the motor at a constant rate per revolution of the spindle, of means for varying the operation of said switch to vary the rate of operation of the motor.

11. In a control system for a machine tool, the combination with a rotating work spindle, a tool rest, and a motor for effecting feeding movements of the tool rest, of means for operating said motor to effect longitudinal and lateral feeding movements of said rest at any desired rate per revolution of said spindle.

12. In a control system for a machine tool, the combination with a rotating work spindle, a tool rest movable laterally and longitudinally with respect to said spindle, and a motor for effecting feeding movements of the rest, of means for operating said motor to selectively effect lateral and longitudinal feeding movements of the rest at any desired rate per revolution of the spindle and to effect traversing movement thereof in either direction.

13. In a control system for a machine tool, the combination with a rotating spindle, a tool rest movable laterally and longitudinally with respect to the spindle, and a motor for operating the tool rest, of means for operating the motor to effect intermittent feeding movements of the rest laterally and longitudinally with respect to the spindle and for effecting traversing movement of the rest longitudinally and laterally in either direction with respect to said spindle.

14. In a control system for a machine tool, the combination with a rotating work spindle, a tool rest movable laterally and longitudinally with respect to said spindle, and a motor for moving said rest, of means for so operating said motor as to effect intermittent lateral and longitudinal feeding movements of the rest and for effecting constant traversing movement in either direction, and means for varying the rate of intermittent feeding movements.

15. In a control system for a machine tool, the combination with a rotating spindle, a tool rest movable laterally and longitudinally with respect to the spindle, and a motor for operating the tool rest, of means for operating the motor to effect intermittent feeding movements of the rest laterally and longitudinally and for continuously moving the rest longitudinally and laterally in either direction, said intermittent feeding movements being effected at any desired rate per revolution of the spindle, and means for varying the rate of feeding the tool rest per revolution of the spindle.

16. In a control system for a machine tool, the combination with a rotating spindle, a tool rest movable with respect to the spindle, and means for operating said motor to effect intermittent feeding movements of the rest, said feeding movements being effected at a constant rate per revolution of the spindle, and means for varying the rate of feeding per revolution of the spindle.

17. In a control system for a machine tool, the combination with a rotating spindle, a tool rest movable laterally and longitudinally with respect to the spindle, and means for operating said motor to effect intermittent feeding movements of the rest laterally and longitudinally, said feeding movements being effected at a constant rate per revolution of the spindle, and means for varying the rate of feeding per revolution of the spindle.

18. In a system of control for a machine tool, the combination with a work spindle, a controller operated in accordance with the rotation of the spindle, a tool rest adapted to move laterally and longitudinally with respect to the spindle, a motor for effecting lateral and longitudinal movement of the rest, and a limit switch operated by said motor, of means comprising two main switches for operating the motor in a forward and in a reverse direction and for completing a dynamic-braking circuit therethrough, means for completing circuits through said controller, said limit switch and the main switches to intermittently operate the motor, said controller serving to close the circuits of the main switches and said limit switch serving to open the circuits of said main switches, and means for varying the operation of the limit switch to vary the rate of intermittent feeding movements by the motor.

19. In a system of control for a machine tool, the combination with a work spindle, a controller operated in accordance with the rotation of the spindle, a tool rest adapted to move laterally and longitudinally with respect to the spindle, a motor for effecting lateral and longitudinal movement of the rest, and a limit switch operated by said motor, of means comprising two main switches for operating the motor in a forward and in a reverse direction and for completing a dynamic-braking circuit therethrough, means for completing circuits through said controller and said limit switch and the main switches to intermittently operate the motor, said controller serving to close the circuits of the main switches and said limit switch serving to open the circuits of said main switches, means for varying the operation of the limit switch to vary the intermittent feeding movements of the motor, and means for selectively operating said main switches to effect traversing operation by the motor.

20. In a system of control for a lathe, the combination with a work spindle, a controller directly connected to said spindle, a tool rest movable laterally and longitudinally with respect to the spindle, a feed motor, a clutch mechanism for connecting the motor to effect movement of the rest either laterally or longitudinally of the spindle, and a limit switch operating with said controller to effect intermittent operation of the motor, of means for operating said motor to effect traversing movement of the rest in either direction and longitudinally or laterally with respect to the spindle.

21. In a system of control for a lathe, the combination with a rotatable spindle, a tool rest, two feed screws for respectively effecting movement of the rest longitudinally and laterally with respect to the spindle, a feed motor, and means for selectively connecting the motor to said feed screws, of means jointly operated by the spindle and by the motor for effecting intermittent operation of the motor, and means for operating the motor to effect traversing movement by the rest.

22. In a system of control for a lathe, the combination with a rotatable spindle, a tool rest, two feed screws for respectively effecting movement of the rest longitudinally and laterally with respect to the spindle, a feed motor, and means for selectively connecting the motor to said feed screws, of means jointly operated by the spindle and by the motor for effecting intermittent operation of the motor, and means for so operating the motor as to effect traversing movements by the rest in either direction and longitudinally or laterally with respect to the spindle.

23. In a control system for a machine tool, the combination with a rotating work spindle and a feed motor, of means comprising a controller operated in accordance with the operation of the spindle and a limit switch for effecting feeding operation of the motor, and a set of gear wheels for connecting the switch to the motor and for varying the feeding operation of the motor.

24. In a control system for a machine tool, the combination with a rotating work spindle and a feed motor, of means comprising a controller operated in accordance with the operation of the spindle and a limit switch operated by the motor for effecting feeding operation of the motor.

25. In a control system for a machine tool, the combination with a rotating work spindle and a drum controller operated in accordance with the rotation of said spindle, of a feed motor, a limit switch operated in accordance with the speed of the motor, means for varying the speed ratio between the motor and the limit switch, and means for completing the motor circuit through said drum switch and the limit switch to effect feeding operation of the motor.

26. In a control system for a machine tool, the combination with a rotating spindle, a controller operated in timed relation to the rotation of the spindle, a rotatable limit switch, and a motor connected in circuit with the controller and the switch, said controller and the switch serving to effect feeding operation of the motor, of means for varying the operation of the limit switch to vary the feeding operation of the motor.

27. In a control system for a machine tool, the combination with a rotating work spindle, a tool rest, and a motor for feeding the tool rest, of means for operating said motor to selectively effect longitudinal and lateral feeding operation of said rest at any desired rate per revolution of said spindle.

28. In a control system for a machine tool, the combination with a rotating spindle, a tool rest movable with respect to the spindle, and means for operating said motor to effect feeding operation of the rest, said feeding operation being effected at a constant rate per revolution of the spindle, and means for varying the rate of feeding per revolution of the spindle.

29. In a system of control for a lathe, the combination with a rotatable spindle, a tool rest, two feed screws for respectively effecting movement of the rest longitudinally and laterally with respect to the spindle, a feed motor, and means for selectively connecting the motor to said feed screws, of means jointly operated by the spindle and by the motor for effecting automatic operation of the motor.

30. In a system of control for a lathe, the combination with a work spindle, a controller directly connected to said spindle, a tool rest movable laterally and longitudinally with respect to the spindle, a feed motor, a clutch mechanism for connecting the motor to effect movement of the rest either laterally or longitudinally of the spindle, and a limit switch operating with said controller to effect automatic feeding operation of the motor, of means for operating said motor to effect traversing movement of the rest in either direction and longitudinally or laterally with respect to the spindle.

In testimony whereof, we hereto affix our signatures.

HAROLD L. BLOOD.
LYNDON C. COLE.